UNITED STATES PATENT OFFICE.

WILLIAM CHADD, OF WILKES-BARRE, PENNSYLVANIA.

PAINT.

1,134,819.     Specification of Letters Patent.     Patented Apr. 6, 1915.

No Drawing.     Application filed July 16, 1913. Serial No. 779,404.

*To all whom it may concern:*

Be it known that I, WILLIAM CHADD, a citizen of the United States, residing at Wilkes-Barre, in the county of Luzerne and State of Pennsylvania, have invented a new and useful Paint, of which the following is a specification.

The present invention relates to improvements in paints, the object of the present invention being the provision of an exceedingly durable paint for inside and outside use, and also for use in connection with painting wood or metal and the inside of boiler tubes, the hereinafter set forth ingredients, it having been found when properly mixed for application, being unaffected by strong salt brine and sulfur water.

The ingredients used in the present paint, consist of litharge (lead monoxid), plaster of Paris, and white rosin as the main body of the paint, the same to be mixed with boiled linseed oil and the necessary driers and the color pigment. It is preferable that the dry ingredients be mixed and sold in such state to be mixed to the desired consistency with the boiled linseed oil, the drier and the color pigment. The preferred proportions are litharge six ounces, plaster of Paris six ounces, and white rosin, four ounces. As before stated, when these three ingredients are mixed in the proportions above set forth and are made into a fluid state with boiled linseed oil and the drier, it has been found that after the same has been properly applied with a brush or otherwise, and becomes dry, the three above ingredients, the litharge, plaster of Paris, and white rosin coöperate to produce an exceedingly hard surface, and one which is unaffected by the salt brine and sulfur water test. It has also been found that the same applied to the inside of boilers is unaffected when heat is applied to the boiler for the boiling of water.

What is claimed is:

A paint composed of litharge approximately 6 parts, plaster of Paris approximately 6 parts, white rosin approximately 4 parts, and boiled linseed oil in a sufficient quantity to render the easy application of the paint by a brush.

In testimony that I claim the foregoing as my own, I have hereto affixed my signature in the presence of two witnesses.

WILLIAM CHADD.

Witnesses:
    W. C. GREGORY,
    ESTHER EVANS.

Copies of this patent may be obtained for five cents each, by addressing the "Commissioner of Patents, Washington, D. C."